United States Patent [19]
Milstein

[11] Patent Number: 5,802,763
[45] Date of Patent: Sep. 8, 1998

[54] SPENT MUSHROOM GROWTH MEDIA AS A GROWING MEDIA FOR PLANT SOD MATS

[75] Inventor: Gene Milstein, Golden, Colo.

[73] Assignee: Applewood Seed Company, Arvada, Colo.

[21] Appl. No.: 650,770

[22] Filed: May 20, 1996

Related U.S. Application Data

[60] Provisional application No. 60/014,677 Apr. 1, 1996.

[51] Int. Cl.$^6$ .................................................. A01G 1/00
[52] U.S. Cl. ........................................... 47/56; 47/9
[58] Field of Search .............................. 47/9, 56, 59, 902

[56] References Cited

U.S. PATENT DOCUMENTS

| | | | |
|---|---|---|---|
| 776,246 | 11/1904 | Kanst | 47/58 |
| 2,158,952 | 5/1939 | Timberlake | 47/58 |
| 2,605,589 | 8/1952 | Kuestner | 47/56 |
| 2,876,588 | 3/1959 | Tietz et al. | 47/58 |
| 2,923,093 | 2/1960 | Allen | 47/56 |
| 3,154,884 | 11/1964 | Amar et al. | 47/1.01 R |
| 3,557,491 | 1/1971 | Franklin et al. | 47/56 |
| 3,845,584 | 11/1974 | Mercer | 47/56 |
| 3,863,388 | 2/1975 | Loads | 47/56 |
| 3,890,739 | 6/1975 | Blackburn | 47/56 |
| 3,914,901 | 10/1975 | Muldner | 47/56 |
| 3,991,514 | 11/1976 | Finck | 47/1.2 |
| 4,023,506 | 5/1977 | Robey | 47/58 |
| 4,118,892 | 10/1978 | Nakamura et al. | 47/66 |
| 4,178,715 | 12/1979 | Greenbaum | 47/58 |
| 4,190,981 | 3/1980 | Muldner | 47/56 |
| 4,232,481 | 11/1980 | Chamoulaud | 47/56 |
| 4,385,468 | 5/1983 | Yoshiaki | 47/14 |
| 4,495,725 | 1/1985 | Talbott | 47/85 |
| 4,539,038 | 9/1985 | Gombert | 71/64 |
| 4,603,077 | 7/1986 | Fujimoto et al. | 428/289 |
| 4,658,542 | 4/1987 | Holmberg | 47/86 |
| 4,707,176 | 11/1987 | Durham | 47/59 X |
| 4,720,935 | 1/1988 | Roger et al. | 47/56 |
| 4,786,550 | 11/1988 | McFarland et al. | 428/203 |
| 4,818,585 | 4/1989 | Shipp, Jr. | 428/198 |
| 4,854,075 | 8/1989 | Greiling | 47/73 |
| 4,934,094 | 6/1990 | Walton | 47/56 |
| 4,941,282 | 7/1990 | Milstein | 47/58 |
| 5,209,109 | 5/1993 | Chamoulaud | 73/73 |
| 5,401,281 | 3/1995 | Chamoulaud | 47/1.01 |

FOREIGN PATENT DOCUMENTS

| | | | |
|---|---|---|---|
| 461018 | 11/1949 | Canada . | |
| 853427 | 2/1962 | France | 47/59 |
| 2262258 | 2/1974 | France . | |
| 2518532 | 12/1981 | France . | |
| 266912 | 11/1991 | Japan | 47/59 |
| 1681782 | 10/1991 | U.S.S.R. | 47/59 |
| 1290338 | 9/1972 | United Kingdom . | |

OTHER PUBLICATIONS

Advertisement for "Flowerama", The New York Times, Apr. 13, 1958, p. X29.
Advertisement for Pre-seeded flower carpet, The New York Times, Apr. 19, 1959, p. X31.
Advertisement for "Flowerama", The Washington Star, Apr. 12, 1959, p. C-9.

*Primary Examiner*—John A. Ricci
*Attorney, Agent, or Firm*—Limbach & Limbach L.L.P.

[57] ABSTRACT

A plant sod mat utilizing a planting medium of spent mushroom growth material and a porosity increasing material and methods of preparing mushroom compost and of preparing spent mushroom growth media for use in plant sod mats. A plant sod mat utilizing spent mushroom growth media may comprise two layers of the spent mushroom growth media separated by a sheet of polyester, polypropylene or polyethylene fabric. The plant sod mat may also utilize root binding fabrics comprising polyester, polypropylene or polyethylene.

14 Claims, 2 Drawing Sheets

SPENT MUSHROOM GROWTH MEDIA AS A GROWING MEDIA FOR PLANT SOD MATS

This application claims the benefit under 35 U.S.C. §119 (e) of a United Stated provisional application Ser. No. 60/014,677, filed Apr. 1, 1996.

FIELD OF THE INVENTION

This invention relates to plant sod mats and specifically to the use of spent mushroom growth media as a planting medium for plant sod mats.

BACKGROUND OF THE INVENTION

Sod mats and rolls have long been used in the seed and plant industry as a convenient device for the transport, storage and installation of seeds and seedlings. These products are generally prepared using or including a base sheet upon which the propagating medium and seeds are deposited and a protective upper sheet or veil. These products also usually include some form of adhesive so as to bind the layers of propagating medium, seed, base sheet and protective covering together.

U.S. Pat. No. 4,941,282 (the '282 patent) having the same inventor as this invention describes an improved method of manufacturing and propagating wildflower sod mats and is hereby incorporated by reference. The improvement described in the '282 patent relates to the use of a sod mat which is formed of a sheet or sheets of porous synthetic material, a layer of planting medium and viable wildflower seeds so that upon germination, the root mass of the seeds intermesh with the porous synthetic material forming the sod mat.

The wildflower sod mat, or wildflower carpet (WFC) of the '282 patent discloses the use of a mixture of 50% sphagnum moss, 49% vermiculite or perlite and 1% nutritive material capable of sustaining plant growth as a planting medium.

Although this planting medium works well, it is quite expensive ($50–$60/cu. yd.).

In contrast to the planting medium of the '282 patent, spent mushroom growth media is quite inexpensive ($0–$5/cu. yd.). Spent mushroom growth media is the growth media left over after mushrooms are harvested. Spent mushroom growth media is generally readily available since there are mushroom farms in almost every state in the U.S. Spent mushroom growth media has been used as a soil amendment in the production of certain crops after aging for 6 months to 2 years. However, aged spent mushroom growth media varies tremendously from farm to farm and depending on its age. This variability makes aged spent mushroom growth media difficult to use as a growth media for sod mats.

In contrast to aged spent mushroom growth media, raw spent mushroom growth media is fairly consistent from farm to farm. However, raw spent mushroom growth media is not used directly as a growth media because of high salt (potassium and/or nitrogen) concentrations that burn or kill most crops and low porosity levels that reduce oxygen availability and water movement.

Thus, there is a need for the identification and preparation of an inexpensive and effective planting medium for use with plant sod mats.

SUMMARY OF THE INVENTION

In order to meet these needs, the present invention is directed to an improved plant sod mat wherein the improvement comprises utilizing a planting medium comprising spent mushroom growth material and a porosity increasing material.

In another embodiment, the plant sod mat comprises two layers of spent mushroom growth media separated by a sheet of polyester, polypropylene or polyethylene fabric.

In yet another embodiment, the plants are plugged into the growth media as rooted or unrooted cuttings.

The present invention is also directed to an improved method of propagating plants in sod mats outdoors on the ground wherein the improvement comprises utilizing a layer of spent mushroom growth medium and porosity increasing material for the planting medium.

In another embodiment, the improvement in the method of propagating plants comprises the use of root binding fabrics comprising polyester, polypropylene or polyethylene.

In another embodiment, the improvement in the method of propagating plants comprises the use of two layers of spent mushroom growth media separated by a sheet of polyester fabric in the formation of the sod mat.

In yet another embodiment, the plants are plugged into the sod mat as rooted on unrooted cuttings.

The present invention is also directed to a method of preparing spent mushroom growth media for use in plant sod mats by adding a porosity increasing material to the growth media and leaching the growth media with water to reduce the electrical conductivity to less than 1.25.

DEFINITIONS

In order to provide a clear and consistent understanding of the present invention and claims, including the scope given to such terms, the following definitions are provided:

Mushroom Growth Media: A material consisting of a manure component and a plant component. Manures useful in the invention include: horse, cow, chicken and other animals. Plant components useful in the invention include straw, hay and the like.

Raw Spent Mushroom Growth Media: Mushroom growth media that has supported 3 to 4 crops of mushrooms and has been steam sterilized to destroy mushroom mycelium, weed seed and pathogens. Raw spent mushroom growth media has not been aged.

Aged Spent Mushroom Growth Media: Mushroom growth media that has supported 3 to 4 crops of mushrooms and has been aged for 6 months to 2 years.

Hay: Grass ready for mowing or especially cut and cured for fodder.

Straw: Stalks of grain after threshing.

Ricking: Ricking is a process of forming straw or hay into a stack or pile.

Fabric Sheets. Fabric sheets are used in the creation of the wildflower sod mats. Suitable materials include Reemay made from polyester, Conwed #6275, an extruded and oriented product made from polypropylene and AMOCO CLAF® Fabric: SSS which involves thermobonding of co-extruded fibrillated films of high density polyethylene.

Leaching: Leaching is a process of dissolving out soluble constituents such as salts by percolation of liquid, generally water, through soil.

Plant: Plants suitable for use in the sod mats include biennials, perennials, ornamental plants, broad leaf plants and wildflowers.

Pluging: Plugging is a method of plant establishment where a cutting (rooted or unrooted) is inserted into a planting media. The planting media is gently packed around the base of the cutting to provide support for the growth of the root system of the cutting. Examples of plants suitable for plugging include impatiens, vinca certain wildflowers and other bedding plants.

DESCRIPTION OF THE PREFERRED EMBODIMENT

Figure 1:
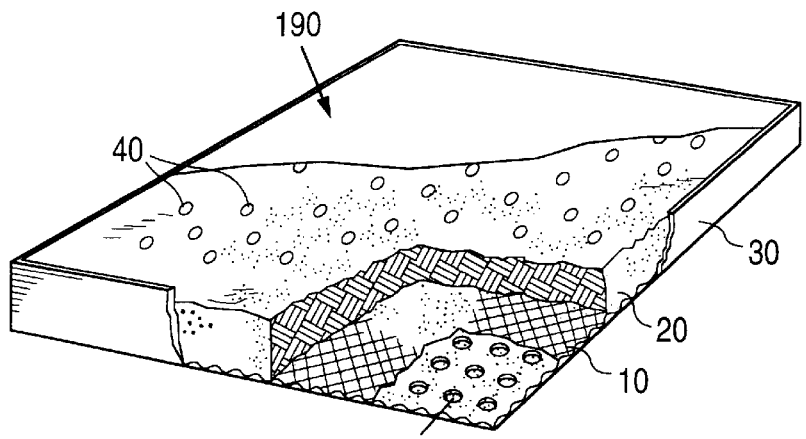
FIG. 1 is a sectional view of a plant sod mat suitable for indoor propagation according to this invention.

Referring to FIG. 1, a sheet of polyester fabric is depicted with a layer of planting medium 20 deposited atop the polyester fabric sheet 10. A polyester fabric sheet 10 such as Reemay® manufactured by E.I duPont de Nemours of Wilmington Delaware is suitable for use. Alternative fabrics include Conwed #6275, an extruded and oriented product made from polypropylene and AMOCO CLAF® Fabric: SSS which involves thermobonding of co-extruded fibrilated films of high density polyethylene. The planting medium layer 20 is approximately one inch deep.

The polyester fabric sheet 10 and planting medium layer 20 are placed in a carrier 30, such as a shallow plastic tray. Ideally, the carrier 30 should be at least ten inches by twenty inches (10"by 20"), so as to be easily carried by a person of average weight and height. The carrier 30 may be made of any lightweight plastic, with drainage holes located at the bottom of the carrier 30. The drainage holes should be sufficient in number, at least one per square inch, so as to permit adequate drainage of planting medium layer 20.

The planting medium layer 20 may be composed of spent mushroom growth material that has been modified to improve porosity and salt levels as discussed in the Examples.

Once deposited upon the polyester fabric sheet 10 and placed in carrier 30, the planting medium layer 20 is thoroughly moistened with water and then allowed to drain via the drainage holes.

Plant seeds 40 are sown over the planting medium layer 20, so that at a minimum the ratio of plant seeds 40 to planting medium layer 20 is one to two pounds of seeds 40 per five hundred to seven hundred-fifty square feet of planting medium layer 20.

The planting medium layer 20 is re-moistened and kept in that state until germination of seeds 40.

Slow release fertilizer such as Osmocote 14-14-14 manufactured by Sierra Chemical Company is applied to the seeds 40 and planting medium layer 20. The fertilizer should be applied to seeds 40 and planting medium layer 20, so that at a minimum, the ratio of fertilizer is one pound of fertilizer per hundred square feet of planted area. Application of the fertilizer should be performed between the third and fourth weeks after germination of seeds 40.

Seedling growth should continue for at least six to twelve weeks, in order for plants 40 to grow and produce a substantial root mass generally designated 60. Cultivation should take place in an temperate environment, such as a greenhouse, so that the temperature remains between sixty and sixty-five degrees Fahrenheit (60°–65° F.). The root mass 60 intertwines with the polyester fabric sheet 10 and planting medium layer 20 so as to form a solid sod mat 50.

After cultivation of the root mass 60, the sod mat 50 is placed in an environment where the minimum temperature is gradually reduced to between thirty to thirty-five degrees Fahrenheit (30°–35° F.). The temperature reduction may take place gradually over a period of one to three weeks.

The sod mat 50 may be maintained for storage and future planting by reducing the environmental temperature from thirty-five degrees Fahrenheit (35° F.) to a range of thirty to thirty-five degrees Fahrenhiet (30°–35° F.). The sod mat 50 is dried by exposure to air to a minimum weight of four to Five pounds (4–5 lbs).

Once at minimum weight, the sod mat 50 may be packed in storage containers, such as corrugated boxes with plastic liners. The sod mat 50 may then be stored in any cold storage system, such as a refrigerator, for a period of at least six months to a year. Before planted in an outdoor environment, tile temperature of the sod mat 50 should be gradually increased, by exposure to heat, to the temperature of the planting environment.

Figure 2:
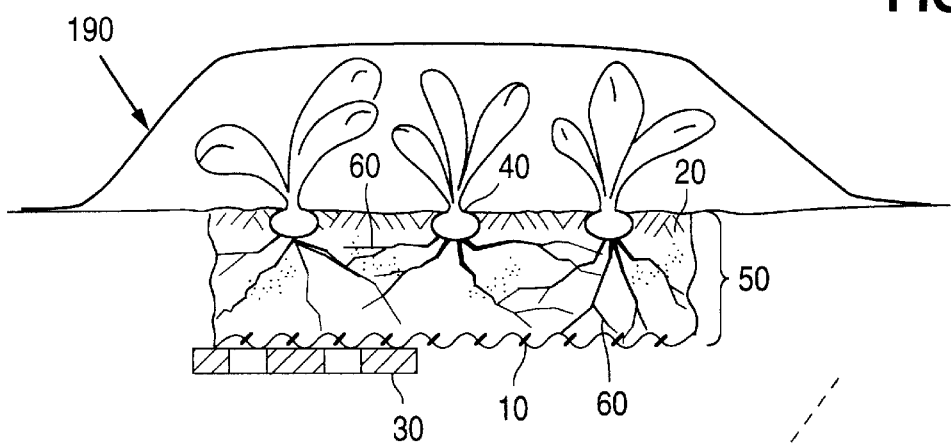
FIG. 2 is a detailed view on an enlarged scale of the plant sod mat suitable for indoor propagation according to FIG. 1.

FIG. 2 is a more detailed view of the embodiment depicted in FIG. 1.

Figure 3:
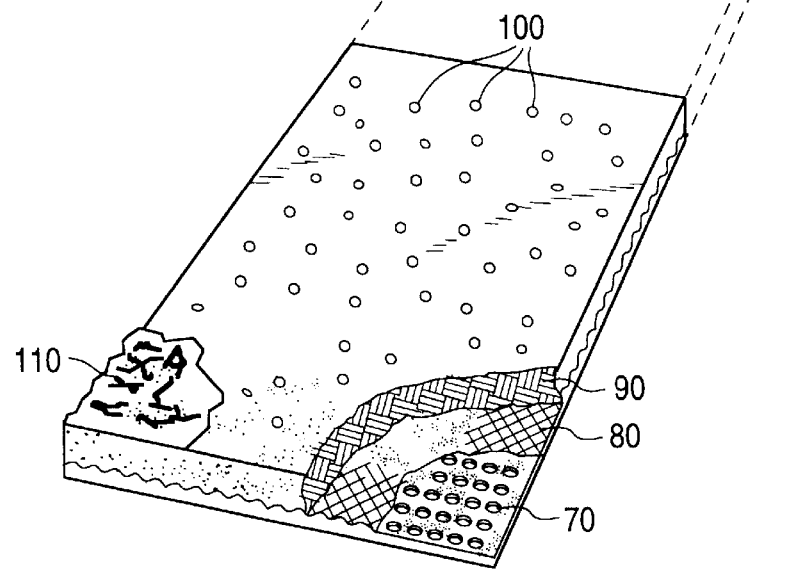
FIG. 3 is a sectional view of another embodiment of the present invention suitable for outdoor propagation.
Figure 4:
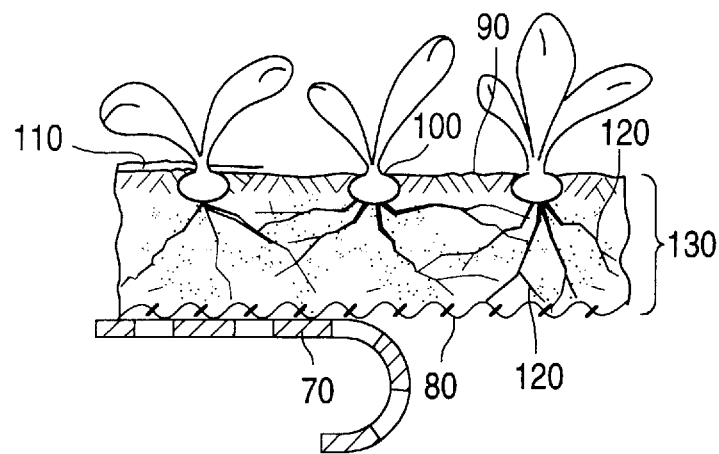
FIG. 4 is a detailed view on an enlarged scale of the plant sod mat suitable for outdoor propagation according to FIG. 3.

Referring to FIG. 3, another embodiment of the present invention, suitable for outdoor propagation, is depicted featuring a sheet of perforated polyethylene 70, and a sheet of polyester fabric 80 placed atop the perforated polyethylene sheet 70.

A layer of planting medium 90 is deposited atop the sheet of polyester sheet 80. The planting medium layer 90 is approximately one and one half inch (1½) to one and three quarters 1¾ inch deep and may be spent mushroom growth media as discussed in the Examples below.

Plant seeds 100 are sown over the planting medium layer 90, at a ratio similar to that disclosed previously. Once sown, plant seeds 100 and planting medium layer 90 are thoroughly moistened with water.

Slow release fertilizer such as Osmocote 14-14-14 may be applied to seeds 100 to aid germination in the second week after sowing.

Additionally, a sheet of light polyester spun bond fabric 110, such as Agryl P17 manufactured by International Paper Company may be placed atop the planting medium layer 90 to prevent erosion and provide protection from the wind. In addition to these features, the light polyester spun bond fabric sheet 110 contributes to weed prevention and aids in moisture and frost control.

Seed germination occurs between the first and third weeks after sowing. Seeds 100 should be watered evenly and regularly so as to spur growth. Cultivation of seeds 100 should continue for six to eighteen weeks, depending on climate arid tile time of year in which cultivation occurs, so as to allow production of a substantial root mass 120. The root mass 120 intermeshes with polyester fabric 80 and planting medium layer 90 so as to form a solid sod mat 130.

Once the sod mat 130 has formed, the perforated polyethylene sheet 70 may be removed arid stored. The sod mat 130 may be divided into four equal pieces in approximately 9×18 inch squares for retail sale in trays. These squares may then either be planted or stored under conditions, such as those outlined previously.

In the preferred embodiment, the sheets of perforated polyethylene 70 arid polyester fabric 80 are three to four feet (3–4') wide and approximately one hundred to three hundred feet (100–300') long. The sheets 70 and 80 are laid out in adjacent rows so as to allow clear access to the sod mat 130 for propagation and harvesting purposes.

Figure 5:
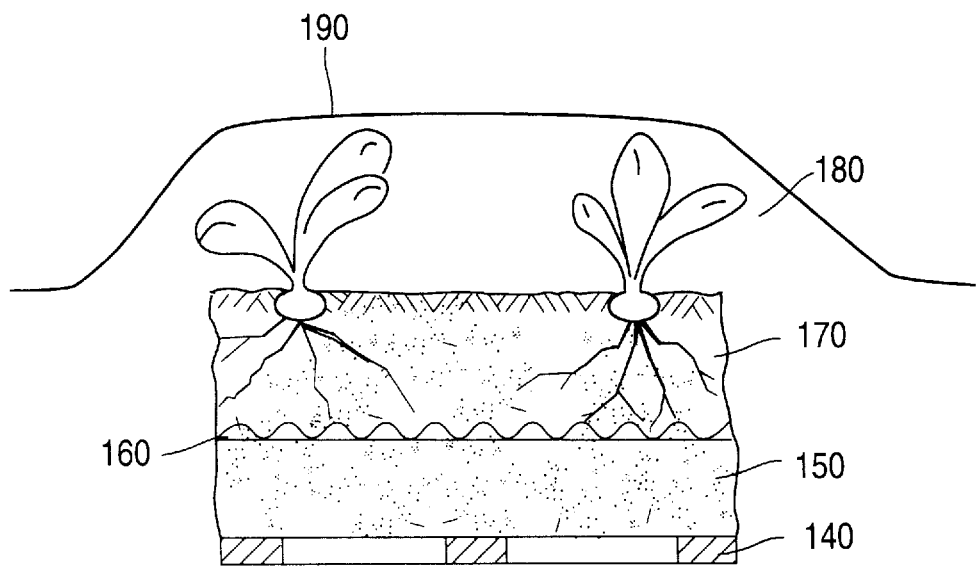
FIG. 5 is a detailed view of yet another embodiment of the present invention suitable for outdoor propagation.

Referring to FIG. 5, another embodiment of the present invention suitable for outdoor propagation, is depicted featuring a sheet of perforated polyethylene 140. A ¾" layer of growing media 150 is placed on top of the perforated polyethylene. A sheet of Reemay (polyester spun-bond) 160 is placed atop the growing media. Another ¾" media is placed on top of the Reemay (180). Impatiens, vinca, certain wildflowers and other plant cuttings are inserted in the top of the media 180. Alternatively, impatiens and certain other crops may also be grown by plugging in two inch cuttings into the top layer of the media. The cuttings may be rooted or unrooted.

Additionally, a sheet of light polyester spun bond fabric 190, such as Agryl P17 manufactured by International Paper Company may be placed atop the planting medium layer 170 to prevent erosion and provide protection from the wind. In addition to these features, the light polyester spun bond fabric sheet 190 contributes to weed prevention and aids in moisture and frost control.

The planting medium layer may be spent mushroom growth media as discussed in the Examples below.

It should be noted that the present invention is suitable for the propagation of wildflowers, the propagation technique disclosed herein is equally applicable to domesticated perennial and annual plants.

The invention will be better understood by way of the following examples.

EXAMPLE 1

Mushroom compost is generally made by composting a plant component such as straw or hay and a manure component such as chicken, horse, cow or turkey manure. Mushroom compost can be supplemented with ammonium nitrate, soy bean meal, gypsum and cotton seed meal.

EXAMPLE 2

Mushroom compost can be made by composting in a two step process: Phase I (outdoor composting) and Phase II (pasteurization).

Phase I: Outdoor Composting

Wheat straw bales are broken up into a large pool of water and soaked. After a day of soaking, chicken manure is added to the wet wheat straw. (Ingredient percentages are listed in Table 1.) Ammonium nitrate may be added to the manure to provide heat when necessary. If the temperature is warm enough to support a suitable compost break down rate ammonium nitrate is omitted and the amount of chicken manure is increased to maintain proper nitrogen levels. Chicken manure is cheaper then ammonium nitrate and thus preferable.

After the straw has been soaked, it is formed into two to four large piles to initiate the composting process. The number of piles created is dependent on the ambient temperature: the lower the ambient temperature the fewer the number of piles. Smaller piles maintain heat and moisture more effectively. Piles are turned over every other day for approximately 10 days. The actual number of days of pile turning depends on the number of preconditioning days selected. The number of turning days depends on the time of year. The piles are turned to minimize the anaerobic core that develops in the center of the piles to insure a continual supply of oxygen to allow proper biological breakdown of the materials.

The composting process is continued for 18 days during which the compost pile shrinks and compacts considerably. As the composting process nears completion, the biological breakdown rate increases considerably requiring additional turning and mixing of the piles. The piles are turned with a front end loader during this stage of the process.

On the eighteenth day of composting, the stock piles are ricked. Ricking is accomplished with a turner machine which builds two 6.5'×6.5'×365' rectangular ricks. Ricked stock piles are supplemented with chicken mature, soy bean meal and gypsum after one day of ricking (See Table 1). Materials are thoroughly mixed with a turner. Water is added as needed to maintain proper moisture content. The ricks are turned again after 2 days during which time they have increased in temperature. On the third day a second supplementation (cotton seed meal and gypsum) is added. The ricks are turned every other day for three days. On the last day, the composted material is transferred to trays for Phase II conditioning.

Phase II: Final Conditioning and Pasteurization

Phase II conditioning and pasteurization is carried out in a temperature-controlled room. Heating of the compost material is generally done naturally by the generation of internal compost heat. The temperature of the beds is allowed to rise to as high as 138° F. during the first two days after transfer to the temperature-controlled room. On the third day, the compost beds are cooled with fresh air and a fan to 130° F. Steam is then injected into the temperature-controlled rooms to raise the bed temperature to 140° F. for at least two hours for pasteurization. The bed temperatures must be cooled down to 132° F. prior to the injection of steam otherwise the bed temperature will rise higher than 150° F. killing microorganisms essential to the composting process. The tray temperatures are gradually decreased to 80° F. during the next four days. It is essential that the tray temperatures are lowered gradually to insure continual compost breakdown.

On the seventh day, the compost is ready to be used as mushroom growth media.

TABLE 1

| 115 Ton Crop Formulation | | | | |
|---|---|---|---|---|
| Materials | Pounds Fresh Weight | Pounds Dry Weight | Percent Nitrogen | Pounds Nitrogen |
| Straw | 230000 | 207000 | 0.5 | 1035 |
| Chicken Manure | 108300 | 80142 | 4 | 3206 |
| Ammonium nitrate | 900 | 900 | 34 | 306 |
| Soy Bean Meal | 12200 | 10980 | 5.9 | 046 |
| Gypsum | 20700 | 20700 | 0 | 0 |
| Cotton Seed Meal | 12000 | 11520 | 0.0 | 700 |
| Total | 384900 | 331242 | 1.8 | 5955 |

*SUPPLEMENTATION*

PRE-RICKING 32 3 YD BUCKETS OF CHICKEN MANURE
18 50 LB BAGS OF AMMONIUM NITRATE

TABLE 1-continued

115 Ton Crop Formulation

FIRST SUPPLEMENTATION 6 3 YD BUCKETS OF CHICKEN MANURE
4 3 YD BUCKETS OF SOY BEAN MEAL
2 3 YD BUCKETS OF GYPSUM
SECOND SUPPLEMENTATION 4 3 YD BUCKETS COTTON SEED MEAL
2 3 YD BUCKETS OF GYPSUM

EXAMPLE 3

Two main types of mushrooms are grown in this media in the world today: button and brown (portabella). Mushroom mycelia are inoculated into mushroom growth media to initiate mushroom growth. Mushrooms are typically grown in the dark. Aside from water, no additional materials, chemicals or solutions are added to the mushrooms after inoculation. Mushrooms are harvested when they are fully grown. Harvesting is typically done by hand. Typical mushroom growth media will support 3 to 4 crops of mushrooms at which time the growth media is spent. Once the mushroom growth media is spent, the media is steam sterilized to destroy mushroom mycelium, weed seed and pathogens. The sterilized, raw spent mushroom growth media is an ideal starting material for preparation of a growth media for plant sod mats.

EXAMPLE 4

Raw spent mushroom growth media cannot be used directly as a growing media for plant sod mats: the porosity level is generally too low and the salt concentration is often too high. Thus, before spent mushroom growth media can be used in plant sod mats it must first be tested for porosity level and salt concentration.

Two methods are generally used to determine the porosity level of raw spent mushroom growth media: the volume method and the weight method. The volume method of soil porosity determination is a multi-step procedure.

Volume Method

1. Take a sample of media and spread it out to dry completely. Place 100 ml. of dried media into a beaker, packing lightly as it is filled.

2. Measure out 100 ml. of water into a beaker and slowly pour it into the beaker with the media until the soil and water lines are equal. Some water is generally left over.

3. Wait about 15 minutes to give the media time to absorb water. More water is added as necessary until the media and water lines are equal.

4. Subtract the amount of water left in the water beaker from 100 ml. Record this number, which will be the Total Porosity.

5. Take the beaker with the media and water and top it over an empty beaker. Drain the water off the media until it stops dripping.

6. Measure and record the amount of water that was drained off of the media at step 5. This is the Aeration Porosity.

7. Subtract the Aeration Porosity from the Total Porosity. This value will be the Retention Porosity.

The weight method of soil porosity determination is also a multi-step procedure.

Weight Method

1. In order to insure accuracy, choose beakers that weigh the same. Dry out a suitable mushroom media sample completely and pack lightly into a beaker to simulate field conditions as closely as possible.

2. Place an empty beaker on a scale and zero out the scale.

3. Weigh the dry media/beaker and record the value. This value will be the Dry Weight.

4. Add water to the media in the beaker until the water and media lines are even.

5. Wait about 15 minutes to allow the media to absorb the water. More water is added if needed to even out media and water lines. (This is the point when the media is fully saturated and pore spaces are filled.)

6. Weigh the beaker with media and water, and record the value. This value will be the Total Weight.

7. Tip beaker with media and water, and drain off the water. The bottom of the beaker must be propped up so that the water can be allowed to drain for a couple of hours.

8. After water is thoroughly drained from the beaker of media, weigh the media in the beaker again. Record this value, which is the Saturated Weight.

9. Subtract the Saturated Weight from the Total Weight. This value will be used to determine the Aeration Porosity.

10. Subtract the Dry Weight from the Saturated Weight. This value is used to determine the Water Retention Porosity.

11. Add the Water Retention Porosity to the Aeration Porosity value to obtain the Total Porosity.

12. Convert the percentages by dividing each number from step 9, 10 and 11 by the Total Weight and multiplying by 100.

Sample Determination:

Dry Weight=28 g.

Total Weight=105 g.

Saturated Weight=83 g.

105−83=22: Aeration Porosity=22/105=21%

83−28=55: Retension Porosity=55/105=52%

55+22=77: Total Porosity=77/105=73%

EXAMPLE 5

Once the porosity is determined, a suitable amount of a porosity increasing material is added to the raw spent mushroom growth material. Suitable porosity increasing materials include rice hulls, wheat hulls, almond hulls, bark from trees or bushes and the like. Porosity increasing materials are generally added to increase the porosity of the mushroom media to 15 to 25%. It has been determined that the ideal porosity for plant sod mats is 20%. Porosity increasing materials such as rice hulls provide long term stability and increase aeration of the media.

EXAMPLE 6

Raw spent mushroom growth media must be leached to remove salts prior to use in plant sod mats. Leaching is performed by applying the raw spent mushroom media in a 2" layer on the ground on top of the perforated polyethylene and Reemay (spun-bond polyester fabric). A triangulated irrigation system is used to apply ½" of water to the 2" of mushroom media. An electrical conductivity (EC) test is performed to determine the salt level in the compost mixture. The media is suitable for growing if the salt level is between 0.75 and 1.25 after 6 random samples are tested. If the salt (EC) level is still too high (greater than 1.25) the leaching method is repeated daily until the salt level is in the appropriate range.

EXAMPLE 7

Salt concentrations in raw spent mushroom growth media can be estimated by determining the electrical conductivity (EC) of the soil solution. Electrical conductivity can be determined by a dry method or a field squeeze method. The dry method for EC soil testing is a multi-step process.

Dry Method

1. Take a representative sample from about 6–10 places in the area to be tested. Scrape off the very top layer of soil and do not include in the sample to be tested.

2. Spread out the sample on a tray or in a box and allow to air dry.

3. Measure out 2 grams of soil (air dried) and place in a non-breakable container; 3 oz. disposable dixie bathroom cups are suitable.)

4. Add 50 ml. of deionized, reverse osmosis of distilled water.

5. Mix slightly and then let sit covered for 20 minutes.

6. Read EC on EC meter. A suitable EC meter is a Cardy Twin Conductivity Meter.

The field squeeze method for EC soil testing is also a multi-step process:

Field Squeeze Method

1. Take a small handful of saturated growing medium 15 minutes after a thorough irrigation.

2. Place the saturated soil on a 6 inch square of cheesecloth or into a paper coffee filter and squeeze a small amount of liquid onto the appropriate EC meter.

EXAMPLE 8

In addition to EC determinations it is important to determine the nitrogen levels and pH values of the mushroom growth media. Two methods of soil preparation are utilized for such determinations: the extraction method and the saturated media extract method. The extraction method is a multi-step process.

Extraction Method

1. Measure a known volume of root media in a beaker or cup (usually 50–100 ml—or ¼ to ½ cup). Fill firmly so it is compressed as it was in the pot. Be consistent when measuring. DO NOT lightly fill or heavily pack the beaker. Place the sample into a cup or beaker.

2. Place 1 equal volume of distilled water into the cup. Allow the solution to equilibrate (15–30 minutes). Measure pH by placing a pH electrode directly into the slurry—or placing a sample of the solution on a flat electrode.

3. Add 1 more volume of distilled water into the cup, mix the sample and wait 5 minutes. Measure the EC after sieving out the large particles of media. The EC can be read directly in the slurry with some electrodes but sieving is preferred.

The saturated media extract method is also a multi-step process.

Saturated Media Extract Method

1. Place 300 to 500 mls (or 1 to 2 cups) of the root media sample in a cup or beaker.

2. Add distilled water slowly, constantly stirring the sample with a spatula or knife. Add enough distilled water so that the sample behaves like a paste, the surface glistens with water, but there is no free water on the surface of the sample.

3. After 15 minutes, add more water if needed. Measure pH by placing the electrode directly into the media/water mixture.

4. Extract the solution from the media using a buchner funnel, side arm, flask and vacuum pump—or a filter bag or sieve for the flat electrode meters. Make any additional measurements (EC, nitrate nitrogen, potassium) using the extracted solution.

Typical mushroom media nitrogen and EC levels are shown in Table 2.

TABLE 2

TYPICAL (SOIL) MUSHROOM MEDIA TRIALS TESTING FOR NITROGEN & EC

| DATE | | |
|---|---|---|
| 02/02/96 | 02/21/96 | 02/27/96 |
| ALAMOSA | | |
| EC = .56<br>$NO_3$ = 500<br>$NO_3N$ = 113<br>Porosity 21 69 85 | Fertilized 2/2<br>EC = .95<br>$NO_3$ = 760<br>$NO_3N$ = 172 | EC = 1.11<br>$NO_3$ = 1200<br>$NO_3N$ = 271.2 |
| MIAMI | | |
| EC = .11<br>$NO_3$ = 490<br>$NO_3N$ = 110.74<br>Porosity 20 56 70 | Fertilized 2/2<br>EC = 1.49<br>$NO_3$ = 660<br>$NO_3N$ = 147 | EC = 1.46<br>$NO_3$ = 1000<br>$NO_3N$ = 226 |
| MONTEREY | | |
| EC = .84<br>$NO_3$ = 140<br>$NO_3N$ = 31.6<br>Porosity 20 64 77 | Fertilized 2/2<br>EC = 1.75<br>$NO_3$ = 1300<br>$NO_3N$ = 293.8 | EC = .96<br>$NO_3$ = 1100<br>$NO_3N$ = 243.6 |
| PENNSYLVANIA | | |
| EC = .62<br>$NO_3$ = 510<br>$NO_3$ = .26<br>Porosity 20 54 75 | Fertilized 2/2<br>EC = .78<br>$NO_3$ = 1000<br>$NO_3N$ = 226 | EC = 1.08<br>$NO_3$ = 1200<br>$NO_3N$ = 271.2 |
| CONNECTICUT | | |
| EC = 2.1<br>$NO_3$ = 330<br>$NO_3N$ = 74.5<br>Porosity 21 58 79 | Not Fertilized<br>Leeched Twice<br>EC = 1.95<br>$NO_3$ = 20<br>$NO_3N$ = 47.5 | EC = 2.5<br>$NO_3$ = 400<br>$NO_3N$ = 90.4 |
| CONNECTICUT CONTROL | | |
| | Not Fertilized<br>Leeched Twice<br>EC = 1.95<br>$NO_3$ = 20<br>$NO_3N$ = 47.5 | EC = 2.0<br>$NO_3$ = 90<br>$NO_3N$ = 156 |
| REGULAR SOD | | |
| Porosity 21 69 85 | Not Fertilized<br>EC = .96<br>$NO_3$ = 420<br>$NO_3N$ = 95 | EC = .90<br>$NO_3$ = 830<br>$NO_3N$ = 157.5 |
| REGULAR SOD | | |
| | Not Fertilized<br>EC = .96<br>$NO_3$ = 420<br>$NO_3N$ = 95 | EC = .78<br>$NO_3$ = 750<br>$NO_3N$ = 109.5 |

EXAMPLE 9

In addition to determining soil EC and nitrogen levels it is important to determine the levels of other key plant nutrients as well as pH values in mushroom growth media. Multiple samples of raw spent mushroom growth media were analyzed for soil pH using a pH meter and the following nutrients: ammonia nitrogen, nitrate nitrogen, phosphate phosphorus, potassium, calcium and specific conductance. The results are shown in Table 3. Additional fertilizer is added to the growth material to bring the nutrients to recommended levels.

TABLE 3

SOIL ANALYSIS

| Sample # | Bench # | pH | Ammonia Nitrogen | Nitrate Nitrogen | Phosphate Phosphorus | Potassium (Potash) | Calcium | Specific Conductance |
|---|---|---|---|---|---|---|---|---|
| Alameda | | 7.41 | 200 | 600 | 2416 | 495 | 9710 | 115 |
| Monterey | | 7.84 | 185 | 275 | 1100 | 750 | 8820 | 240 |
| Connecticut | | 8.07 | 140 | 25 | 715 | 8905 | 8250 | 490 |
| Pennsylvania | | 7.40 | 115 | 350 | 2135 | 555 | 7045 | 180 |
| Reg. Sod Media | | 6.50 | 65 | 250 | 610 | 445 | 3300 | 130 |
| Miami | | 7.17 | 130 | 350 | 2800 | 455 | 9990 | 225 |
| Recommend Level | | 5.5 to 7.0 | 50–200 | 500–1000 | 125–400 | 550–1000 | 2500–6000 | 160–300 |

EXAMPLE 10

To insure that proper nutrient levels are maintained in the mushroom growth media a special formula of slow release fertilizer is supplied. The fertilizer composition is shown in Table 4.

TABLE 4

| Fertilizer Formula | |
|---|---|
| 3 lb Nitroform or Nitrolene | 38-0-0 |
| 3 lb Triple Superphosphate | 0-45-0 |
| 1 lb Potassium Sulfate | 0 0 52 |
| 5 lb Gypsum | |
| 1 lb Unimix plus II 10-10-5 | (Any soluble 20-20-20 + minor elements) |

(Amounts are on a cubic yard basis.)

When the salt level is acceptable, seed and crop cover may be applied on top of the media. Every two weeks the nitrogen level is measured with a nitrogen meter and an EC reading is taken with an EC meter. Every six weeks a full soil sample is submitted to a soil testing laboratory for a complete nutrient analysis (see Table 3). As the mushroom compost proceeds to decompose, varying amounts of salts are released. These salt levels must be continually monitored to insure that they are maintained in an acceptable range. Nitrogen levels must be maintained at levels between 500 and 1000 ppm. Additional fertilizer may be necessary. Additional leaching is rarely needed.

EXAMPLE 11

A major problem in growing plants in mushroom media is chlorosis or yellowing of the plants. Chlorosis can be caused by a number of different soil conditions:

1. The most common cause of chlorosis is improper leaching of raw spent mushroom compost resulting in high salt levels. Potassium salts are particularly problematic. Excess salts can be removed by leaching with water when the media is in place on top of the poly and Reemay layers. Salt levels are tested with an Electrical Conductivity meter. Alternatively, soil samples can be sent to a soil testing laboratory for analysis to ensure that the EC (salt) level is low enough.

2. High media pH (greater than 7) can also cause chlorosis by making the iron (Fe) in the media unavailable to plant roots. High media pH can be remedied by several methods. Firstly, chelated iron can be added in liquid form. Secondly, sulfur can be spread on top of the growth media. Thirdly, iron sulfate can be added to the media. Lastly, in extreme cases, sulfuric acid can be added directly to the irrigation water.

3. Over-watering can also cause chlorosis. Overwatering can suffocate roots and reducing iron uptake. Overwatering is treated by watering minimally for 7 to 10 days to allow air back into the soil.

4. Ammonia gas can also cause chlorosis. Gaseous ammonia can result from the composting process. Gaseous ammonia is treated by adding gypsum to the growing media. High gaseous ammonia levels can also result from the use of ammonium nitrate as a fertilizer. If this is suspected, potassium nitrate ($KNO_3$) can be substituted as a nitrogen source.

EXAMPLE 12

Nitrogen levels appear to be the biggest determining factor in growth and foliage production rates with plant sod mats grown with raw spent mushroom compost. Plant growth is minimal when nitrogen levels are too low. Addition of soluble fertilizers such as Unimex (see Table 4) is the quickest way to encourage faster plant growth. Cool or cloudy conditions can also slow plant growth regardless of nitrogen availability, however. It is thus important to perform soil nitrogen tests to confirm low soil nitrogen levels before adding additional fertilizer.

EXAMPLE 13

A new technology for the production of certain species of flowers (bedding plants) has been developed that is different than the standard Wildflower Carpet technique. Roots of impatiens and vinca will not penetrate the Reemay root binder fabric when they are placed directly on top of the polyethylene film because of the thick and fragile root systems of these plants.

To avoid this problem ¾" of growing media is first placed on top of the perforated polyethylene. Secondly, Reemay (polyester spun-bond) is placed on top of the media. Another ¾" media is placed on top of the Reemay. Impatiens, vinca and other plants are sown on top of the media and covered with the crop cover to complete the planting process. Impatiens and certain other crops may also be grown by plugging in two inch cuttings into the top layer of the media. The cuttings may be rooted or unrooted.

EXAMPLE 14

Drainage is extremely critical to the production of a good plant sod crop. Saturated sub-soils can cause many undesirable complications in the growth of plant sod. (Sub-soil is the ground underneath the perforated polyethylene film.) Heavy clay soils are especially problematic. Incorporation of ¾"–2" of wood chips into the top 12" to 18" inches of the subsoil markedly improves drainage. In addition, this extra layer provides a substantial reservoir for excess water in the event of heavy rains or over-watering thereby reducing soil saturation.

Although the invention has been described in some respects with reference to specified preferred embodiments thereof, many variations and modifications will be apparent to those skilled in the art. It is, therefore, the intention that the following claims not be given a restrictive interpretation but should be viewed to encompass such variations and modifications that may be routinely derived from the inventive subject matter disclosed.

What is claimed is:

1. A plant sod mat comprising:
   a sheet of perforated polyethylene,
   a sheet of polyester, polypropylene or polyethylene fabric atop the perforated polyethylene,
   a planting medium atop the fabric,
   plants growing in the planting medium, wherein the improvement comprises a planting medium comprising raw spent mushroom growth media and a porosity increasing material.

2. The sod mat of claim 1 wherein the porosity increasing material is selected from the group comprising rice hulls, wheat hulls, almond hulls and bark material.

3. The sod mat of claim 2 wherein the planting medium has a porosity of 20 to 30%.

4. The sod mat of claim 1 wherein the mushroom growth media has an electrical conductivity less than 1.25.

5. The sod mat of claim 1 wherein the mushroom growth media has a pH between 5.5 and 7.0.

6. A plant sod mat comprising:
   a sheet of perforated polyethylene,
   a first layer of planting medium atop the perforated polyethylene,
   a sheet of polyester, polypropylene or polyethylene fabric atop the first layer of planting medium,
   a second layer of planting medium atop the fabric sheet, and
   plants planted in the second layer of planting medium wherein the first and second layers of planting medium comprise raw spent mushroom growth material and a porosity increasing material.

7. The sod mat of claim 6 wherein the porosity increasing material is selected from the group comprising rice hulls, wheat hulls, almond hulls and bark material.

8. The sod mat of claim 6 wherein the planting medium has a porosity of 20 to 30%.

9. The sod mat of claim 6 wherein the mushroom growth media has an electrical conductivity less than 1.25.

10. The sod mat of claim 6 wherein the mushroom growth media has a pH between 5.5 and 7.0.

11. The sod mat of claim 6 wherein the planted plants are plugged into the second layer of planting medium.

12. A method of propagating plants on sod mats comprising:
   a) providing a sheet of perforated polyethylene;
   b) positioning a sheet of polyester, polypropylene or polyethylene fabric atop the perforated polyethylene;
   c) depositing a layer of raw spent mushroom growth media and porosity increasing material on the fabric sheet combination;
   d) applying sufficient water to the mushroom growth media to reduce the electrical conductivity of the media to less than 1.25;
   e) spreading viable plant seed over the media;
   f) moistening the media and seeds;
   g) germinating seeds in the media, such that the roots of the seedlings mesh with the polyester, polypropylene or polyethylene fabric forming a sod mat;
   h) removing the mat from the perforated polyethylene; and
   i) cutting the sod mat into sections for packaging, storage and installation.

13. A method of propagating plants on sod mats comprising:
   a) providing a sheet of perforated polyethylene;
   b) positioning a first layer of raw spent mushroom growth media and porosity increasing material atop the sheet of perforated polyethylene;
   c) positioning a sheet of polyester, polypropylene or polyethylene fabric atop the first layer of raw spent mushroom growth and porosity increasing material;
   d) depositing a second layer of raw spent mushroom growth media and porosity increasing material on the fabric to form a raw spent mushroom growth media and porosity increasing material bilayer;
   e) applying sufficient water to the bilayer to reduce the electrical conductivity of the bilayer to less than 1.25;
   f) spreading viable plant seed over the second layer of raw spent mushroom growth and porosity increasing material;
   g) moistening the first and second layers of the media and the seeds;
   h) germinating seeds in the second layer of the media such that the roots of the plants mesh with the bilayer forming a sod mat;
   i) removing the mat from the perforated polyethylene; and
   j) cutting the sod mat into sections for packaging, storage and installation.

14. A method of propagating plants on sod mats comprising:
   a) providing a sheet of perforated polyethylene;
   b) positioning a first layer of raw spent mushroom growth and porosity increasing material atop the sheet of perforated polyethylene;
   c) positioning a sheet of polyester, polypropylene or polyethylene fabric atop the first layer of raw spent mushroom growth and porosity increasing material;
   d) depositing a second layer of raw spent mushroom growth media and porosity increasing material on the polyester fabric to form a raw spent mushroom growth and porosity increasing material bilayer;
   e) applying sufficient water to the bilayer to reduce the electrical conductivity of the bilayer to less than 1.25;
   f) moistening the first and second media layers;
   g) plugging cuttings into the second layer of medium such that the cuttings grow roots and the roots of the cuttings mesh with the planting media bilayer forming a sod mat;
   h) removing the mat from the perforated polyethylene; and
   i) cutting the sod mat into sections for packaging, storage and installation.

* * * * *